Aug. 26, 1969   J. M. HASTINGS   3,463,181

PRESSURE RELIEF VALVE

Filed July 28, 1967

INVENTOR.
John M. Hastings
BY
Barnard, McGlynn & Reising
ATTORNEYS

United States Patent Office 3,463,181
Patented Aug. 26, 1969

3,463,181
PRESSURE RELIEF VALVE
John M. Hastings, 234 Tuckahoe,
Birmingham, Mich. 48010
Filed July 28, 1967, Ser. No. 656,932
Int. Cl. F16k 17/06, 17/08; F16l 31/00
U.S. Cl. 137—382                              14 Claims

ABSTRACT OF THE DISCLOSURE

A combination relief valve and coupling of the type for interconnecting two hoses or similar fluid lines and including a housing allowing fluid flow therethrough and having a plurality of relief passages for exhausting fluid to create a force in a direction opposite to the direction of fluid flow through the housing. A sleeve is slidably supported in the housing and the housing has a seat adjacent the relief passages for engaging the sleeve to close the relief passages. A spring biases the sleeve against the seat and a nut threadedly engages the housing for adjusting the compression of the spring. The sleeve includes an annular shoulder disposed thereabout for coacting with the housing to define a pressure chamber and a plurality of passages extend through the sleeve to transmit the pressure of the fluid flow through the housing to the pressure chamber so that the sleeve is moved against the action of the spring and opens the relief passages when the pressure in the fluid flow exceeds a predetermined value. In addition, the value of the pressure in the fluid flow at which the sleeve moves to open the relief passages can be adjusted by rotating the nut to change the compression on the spring.

---

Although it will be clear that the instant invention may have utility in various environments, it will be described in connection with its very significant utility when used as a coupling between fire fighting hoses. Typical fire fighting equipment includes a fire engine having a pump which supplies fluid under pressure to a hose, the hose extends from the pump to a nozzle end which is at or adjacent the fire. The end of the hose is held by one or more firemen. In a typical situation, it is possible for the pump to be providing 100 lbs./sq. in. pressure to the hose while the end of the hose, which may be 100 feet from the pump, has an 80 lbs./sq. in. pressure. In other words, a 10 lbs./sq. in. pressure loss occurs over each 50 feet of fire hose. The gerater the length of the hose extending from the pump, the greater the pressure necessary at the pump in order to provide the required pressure at the end of the hose. Thus, in some portions of the fire hose, the pressure is very high. It frequently occurs that part of a building may fall upon the hose or a vehicle may be driven over the hose so as to cause a momentarily further increase of the pressure in the hose which is sufficient to rupture the hose.

The fluid being ejected from the nozzle end of the fire hose creates a force on the nozzle tending to move the nozzle in the direction opposite to the direction of flow in the stream of fluid being ejected therefrom. This force tending to move the nozzle is proportional to the pressure in the hose and this pressure is determined by the pump supplying the hose. There is frequently a lack of communication between the pump end and the nozzle end of the hose with a result that the pump produces a pressure which is too high and consequently the one or more firemen at the nozzle end cannot hold or control the nozzle end of the hose against the force resulting from ejection of fluid therefrom.

Accordingly, it is an object and feature of this invention to provide a combination relief valve and coupling assembly which may be utilized to interconnect two lengths of hose to exhaust fluid when the pressure in the fluid flow reaches a predetermined value and which is adjustable so that an operator at the nozzle end of the hose may adjust the assembly so that the pressure does not exceed a predetermined value whereby complete control of the nozzle end may be maintained.

Another object and feature of this invention is to provide a relief valve coupling assembly for interconnecting two fluid lines to exhaust fluid therefrom when the pressure reaches a predetermined value and which is adjustable so that the assembly may be set to relieve pressure at any one of various different pressures in the fluid flow.

A further object and feature of this invention is to provide a relief valve coupling assembly for interconnecting two fluid lines to exhaust fluid when the pressure reaches a predetermined value but does not restrict or otherwise affect the flow therethrough.

Other objects and attendant advantages of the present invention will be readily appreciated as the same becomes better understood by reference to the following detailed description when considered in connection with the accompanying drawings wherein.

Figure 1:
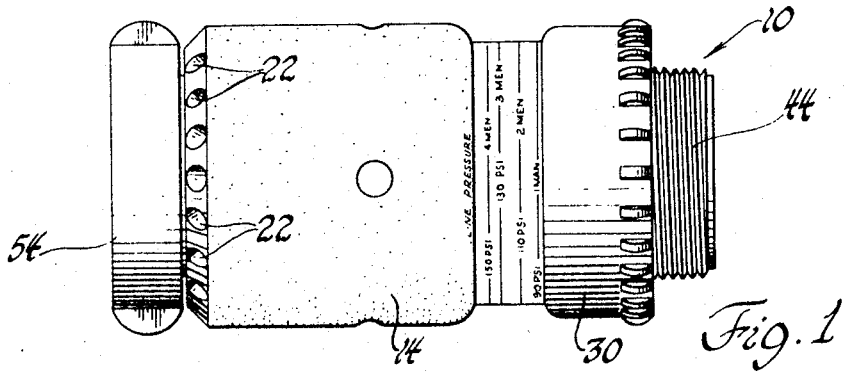
FIGURE 1 is a side elevational view of a preferred embodiment of the instant invention.

Referring now to the drawings, a relief valve and coupling combination assembly is generally illustrated at 10. The assembly 10 is adapted for interconnecting and allowing fluid flow between two fluid lines.

Figure 2:
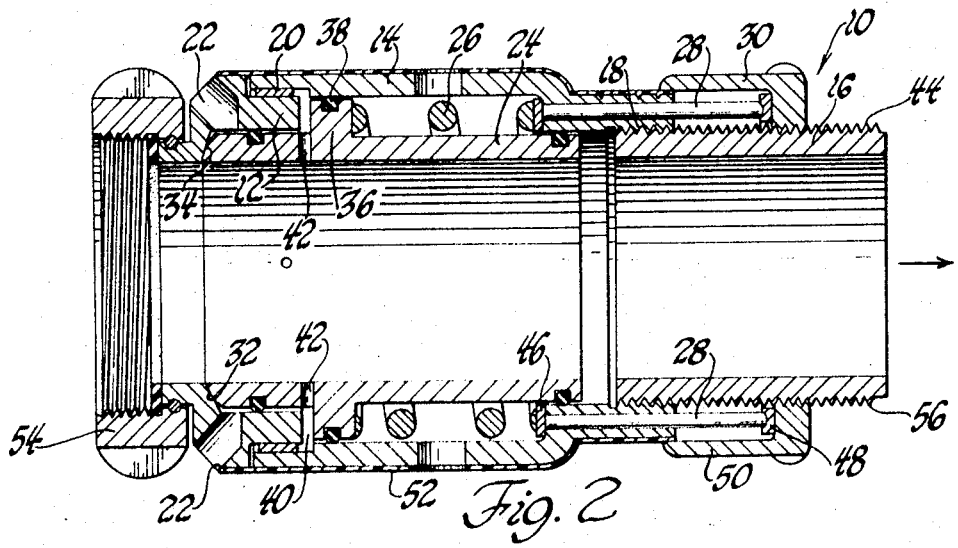
FIGURE 2 is an enlarged cross-sectional view of the embodiment illustrated in FIGURE 1.

The assembly 10 includes a housing comprising the components 12, 14 and 16, it being evident that the housing may be made of a plurality of components or of one integral member. The component 16 is secured to the component 14 by the threads 18 and the component 12 is secured to the component 14 through the ring 20 which may be brazed or otherwise secured in position. Threads may be substituted for the ring 20 or the components 12 and 14 may be brazed or welded together. The housing provides a fluid flow passage for allowing axial fluid flow therethrough in the direction of the arrow as illustrated in FIGURE 2. The housing includes a plurality of relief passages 22 extending through the housing for communicating with the fluid flow through the housing. The relief passages 22 provide jet flows of fluid which in turn provide a reaction force acting in the direction opposite to the direction of fluid flow through the housing. There is also included a valve means comprising the sleeve 24 which normally closes the relief passages 22 and is responsive to a predetermined fluid pressure in the fluid flow for opening the relief passages 22. There is also included an adjustment means comprising the spring 26, the pins 28 and the nut 30 for allowing the assembly 10 to be selectively adjusted so that the sleeve 24 opens at any one of various different selected fluid pressures in the fluid flow.

The sleeve 24 is an annular member slidably supported in the housing and includes an end 32 engaging an annular seat 34 which is defined by the housing. The sleeve 24 includes an annular shoulder 36 which is disposed circumferentially thereabout and coacts with the housing through the seal 38 to define a pressure chamber 40. Passages 42 extend through the sleeve 24 so as to provide fluid communication between the fluid flow through the housing and the pressure chamber 40. It is important to note that the axial fluid passageway through the sleeve 24 is of a uniform cross section therealong and has a cross-sectional area which is no less than the smallest cross-sectional area of the passageway through the housing. Actually, as illustrated, the passageway through the sleeve 24 is equal to cross-sectional area to the passageway through the housing. Thus, the valve assembly may relieve or exhaust fluid flowing therethrough but does not restrict or otherwise affect the fluid flow therethrough. Most important is the feature that the fluid flow through the assembly is not restricted and therefore the assembly does not affect line pressure except for pressure relief.

The spring 26 engages the shoulder 36 to bias the sleeve 24 into engagement with the seat 34 to maintain the relief passages 22 closed.

The nut 30 threadedly coacts with the exterior of the housing through the threads 44. A plurality of pins 28 extend through the housing for sliding movement relative to the housing and coact with the spring 26 through the annular ring 46. Another annular ring 48 is disposed between the other end of the pins 28 and the nut 30. Upon rotation of the nut 30, it moves axially along the housing to move the pins 28 thereby to adjust or change the compression of the spring 26 which in turn changes the amount of force necessary to move the sleeve 24 out of engagement with the seat 34.

The housing includes a small diameter portion 16 on which the threads 44 are disposed for coacting with the nut 30 and the enlarged portion 14 through which the pins 28 extend. The nut 30 includes an elongated barrel portion 50 disposed about and in close proximity to the enlarged portion 14 of the housing. A plastic cover 52 is disposed about the housing. The plastic cover 52 may be shrunk fit about the valve. The cover protects the valve and helps prevent the valve from freezing.

There are indicia, as illustrated in FIGURE 1, disposed about the enlarged portion 14 of the housing to indicate the adjusted position of the assembly. It will be noted that the first line indicates "90 p.s.i." In this example one fireman may control the nozzle so long as the pressure at the nozzle end does not exceed 90 p.s.i. The next indicia indicates the adjusted position wherein the fluid flow through the assembly will not exceed "110 p.s.i." and that at 110 p.s.i. two men are necessary to control the nozzle end of the hose. The "130 p.s.i." and "150 p.s.i." positions are similarly set forth. When the nut 30 is rotated so as to be adjacent the component 14 of the housing, the spring 26 will exert a sufficient force on the sleeve 24 that the sleeve 24 will not move from the seat 34 unless the pressure within the valve is unattainably high, i.e., a pressure which could not be reached because of the source or a pressure which would rupture some other component in the fluid flow system. Thus, the indication "Line Pressure" is provided to indicate that the valve assembly will not relieve pressure.

Figure 3:
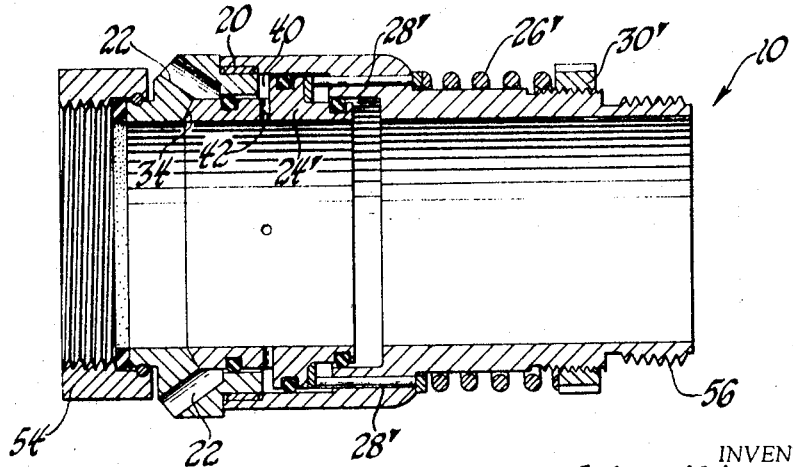
FIGURE 3 is a cross-sectional view of a modification or alternative embodiment of the instant invention.

In the embodiment illustrated in FIGURES 1 and 2 the spring 26 is disposed within the housing and about the sleeve 24, and the pins 28 are slidably disposed through the housing and coact between the nut 30 and the spring 26. In the alternative embodiment illustrated in FIGURE 3 (wherein like numerals indicate like or corresponding parts and prime numerals indicate slightly different parts) the nut 30' threadedly coacts with the housing to adjust the compression of the spring 26' and the pins 28' are slidably disposed through the housing. In contrast, however, the spring 26' is disposed about the housing and in engagement with the nut 30' and the pins 28' coact between the spring 26' and the sleeve 24'.

The spring and the pins are in series to coact between the sleeve and the nut; however, the relative positions of the pins and the spring may be reversed as exemplified by the two embodiments.

The coupling nuts 54 are utilized to threadedly engage a male end of a hose whereas the threads 56 are utilized as the male element to engage a female end of a hose.

It will be evident, therefore, that the relief valve coupling assembly of the instant invention may be disposed between two fire hoses or any other two fluid communication lines and may be adjusted by rotating the nut or 30' so that when the fluid pressure in the flow through the assembly reaches a predetermined value it is transmitted to the pressure chamber 40 through the passages 42 so as to act against the shoulder 36 to move the sleeve off the seat 34 to allow fluid pressure to flow through the relief passages 22. As fluid flow is being jetted or ejected from the relief pasages 22, it creates a force acting on the assembly in a direction opposite to the fluid flow therethrough, hence aiding in the control of the nozzle end of a fire hose.

The embodiments of the invention in which an exclusive property or privilege is claimed are defined as follows:

1. A relief valve coupling assembly for interconnecting and allowing fluid flow between two fluid lines, said assembly comprising; a housing defining an axial fluid path allowing fluid flow therethrough and having an annular seat and at least one relief passage for communicating with the fluid path and extending through said housing adjacent said seat, valve means normally closing said relief passage and responsive to a predetermined fluid pressure in said fluid path for opening said relief passage including an annular sleeve axially slidably disposed in said housing coaxial with said fluid path and normally biased into engagement with said seat to close said relief passage, said sleeve including an annular shoulder disposed thereabout and coacting with said housing to define a pressure chamber, and passage means extending through said sleeve and communicating with said pressure chamber, and adjustment means allowing said assembly to be selectively adjusted so that said valve means will open at any one of various different selected fluid pressures in said fluid path.

2. A relief valve coupling assembly as set forth in claim 1 wherein said valve means includes at least one spring operatively interconnecting said sleeve and said adjustment means, said adjustment means operatively coacting with said housing for selectively adjusting the compression of said spring so that the force on said sleeve may be adjusted whereby said sleeve may slide axially to open said relief passage at any one of said various different fluid pressures in said fluid flow.

3. A relief valve coupling assembly as set forth in claim 2 wherein said adjustment means includes a nut threadedly coacting with the exterior of said housing, and a plurality of pins extending axially through said housing for sliding movement relative thereto, said spring and said pins being disposed between said nut and said sleeve so that the compression on said spring may be adjusted by rotating said nut.

4. A relief valve coupling assembly as set forth in claim 3 wherein said housing includes a small diameter portion for coacting with said nut and an enlarged portion through which said pins extend.

5. A relief valve coupling assembly as set forth in claim 4 wherein said spring is disposed within said housing and about said sleeve, said pins being slidably disposed through said housing to coact between said nut and said spring.

6. A relief valve coupling assembly as set forth in claim 5 wherein said nut includes an elongated barrel portion disposed about and in close proximity to said enlarged portion of said housing.

7. A relief valve coupling assembly as set forth in claim 6 including indicia on said enlarged portion of said housing to coact with said barrel portion of said nut to indicate the adjustment of said assembly.

8. A relief valve coupling assembly as set forth in claim 6 including a plastic covering disposed over said housing.

9. A relief valve coupling assembly as set forth in claim 4 wherein said spring is disposed about said housing and in engagement with said nut, said pins being slidably disposed through said housing to coact between said spring and said sleeve.

10. A relief valve coupling assembly as set forth in claim 4 including an annular ring disposed between said spring and said pins.

11. A relief valve coupling assembly as set forth in claim 4 wherein each of said relief passages provides jet flows of fluid to provide a reaction force acting in the direction opposite to said fluid flow through said housing.

12. A relief valve assembly including a housing allowing fluid flow therethrough and having a plurality of relief passages for communicating with the fluid flow and extending through said housing, and a sleeve slidably supported in said housing, said housing having a seat adjacent said relief passages for engaging with said sleeve to close said relief passages, at least one spring biasing said sleeve against said seat, said sleeve including an annular shoulder disposed thereabout and coacting with said housing when engaging said seat to define a pressure chamber, said sleeve having at least one passage therethrough to transmit the pressure of said fluid flow to said pressure chamber whereby said sleeve is moved against the action of said spring to open said relief passages when the pressure in said fluid flow exceeds a predetermined value.

13. A relief valve as set forth in claim 12 including adjustment means coacting with said housing and said spring to adjust the compression of said spring.

14. A relief valve assembly including a housing having a continuous axial passageway for allowing fluid to flow axially therethrough and including at least one relief passage extending through said housing, and valve means including an annular sleeve axially movably disposed in said housing coaxial with said passageway and being of a uniform cross sectional area no less than the smallest cross sectional area of the fluid passageway through the housing, said sleeve normally closing said relief passage and responsive to a predetermined fluid pressure in said fluid flow for opening said relief passage, said housing and said valve means having configurations and associated together for allowing unrestricted fluid flow therethrough.

References Cited
UNITED STATES PATENTS

| | | | |
|---|---|---|---|
| 2,473,620 | 6/1949 | Teague | 137—508 |
| 2,665,704 | 1/1954 | Kanuch | 137—115 XR |
| 3,146,719 | 9/1964 | Drutchas | 137—115 XR |
| 3,344,806 | 10/1967 | Schultz | 137—494 |

M. CAREY NELSON, Primary Examiner

ROBERT J. MILLER, Assistant Examiner

U.S. Cl. X.R.

137—494